(12) United States Patent
Fox

(10) Patent No.: US 10,202,166 B2
(45) Date of Patent: *Feb. 12, 2019

(54) INTEGRATED AND SELF-CONTAINED SUSPENSION ASSEMBLY HAVING AN ON-THE-FLY ADJUSTABLE AIR SPRING

(71) Applicant: Fox Factory, Inc., Scotts Valley, CA (US)

(72) Inventor: Robert C. Fox, Scotts Valley, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,594

(22) Filed: Dec. 30, 2016

(65) Prior Publication Data

US 2017/0106937 A1    Apr. 20, 2017

Related U.S. Application Data

(63) Continuation of application No. 14/271,395, filed on May 6, 2014, now Pat. No. 9,567,029, which is a (Continued)

(51) Int. Cl.
*B62K 25/04* (2006.01)
*F16F 9/02* (2006.01)
(Continued)

(52) U.S. Cl.
CPC .............. *B62K 25/04* (2013.01); *B60G 15/12* (2013.01); *B60G 17/0523* (2013.01);
(Continued)

(58) Field of Classification Search
CPC ..... B60G 15/12; B60G 17/0523; F16F 13/02; B62K 25/04; B62K 2201/08; B62K 2025/048
(Continued)

(56) References Cited

U.S. PATENT DOCUMENTS 865,151 A    9/1907   Andrew
1,094,567 A  4/1914   Hofmann
(Continued)

FOREIGN PATENT DOCUMENTS

DE    725659 C    9/1942
DE    337508 C    4/1952
(Continued)

OTHER PUBLICATIONS

Fox Factory Catalog (Twin-Clicker Shox), 1983.
(Continued)

*Primary Examiner* — Xuan Lan Nguyen

(57) ABSTRACT

An integrated and self-contained suspension assembly having a gas spring integrated with a shock absorber (damper) is described. The rigid gas cylinder of the air spring is divided into a first gas chamber and a second gas chamber. A flow port connects the first and second gas chambers, and can be manually opened or closed by valve and a simple one-quarter turn rotation of an external knob to instantly switch the gas spring between two different spring rates. The different spring rates are functions of the separate or combined volumes of the two. gas chambers. The integrated suspension assembly is compactly packaged and self-contained, i.e., does not require any externalities, such as gas sources or electricity, to operate.

3 Claims, 11 Drawing Sheets

Related U.S. Application Data continuation of application No. 12/768,523, filed on Apr. 27, 2010, now Pat. No. 8,752,681, which is a continuation of application No. 10/237,333, filed on Sep. 5, 2002, now Pat. No. 7,703,585.

(60) Provisional application No. 60/392,802, filed on Jun. 28, 2002, provisional application No. 60/391,991, filed on Jun. 25, 2002.

(51) Int. Cl.
| | | |
|---|---|---|
| *F16F 9/06* | (2006.01) | |
| *F16F 9/46* | (2006.01) | |
| *B60G 15/12* | (2006.01) | |
| *B60G 17/052* | (2006.01) | |
| *F16F 13/00* | (2006.01) | |
| *F16F 9/32* | (2006.01) | |

(52) U.S. Cl.
CPC .......... *F16F 9/0209* (2013.01); *F16F 9/0236* (2013.01); *F16F 9/06* (2013.01); *F16F 9/46* (2013.01); *F16F 9/461* (2013.01); *F16F 13/002* (2013.01); *B60G 2300/12* (2013.01); *B60G 2500/20* (2013.01); *B62K 2025/048* (2013.01); *B62K 2201/08* (2013.01); *F16F 9/3257* (2013.01); *F16F 2228/066* (2013.01)

(58) Field of Classification Search
USPC ........ 188/278, 322.13, 322.14, 322.2, 299.1; 267/64.26, 64.11, 64.28
See application file for complete search history.

(56) References Cited

U.S. PATENT DOCUMENTS

| | | |
|---|---|---|
| 1,281,079 A | 10/1918 | Sears |
| 1,492,328 A | 4/1924 | Lang |
| 1,946,882 A | 2/1934 | Sherman |
| 1,984,144 A | 12/1934 | Laugaudin |
| 1,992,490 A | 2/1935 | Lewis |
| 2,101,265 A | 12/1937 | Mercier |
| 2,115,072 A | 4/1938 | Hunt et al. |
| 2,265,435 A | 12/1941 | Kinzie et al. |
| 2,329,803 A | 9/1943 | Whisler, Jr. |
| 2,528,822 A | 11/1950 | Dunn |
| 2,569,503 A | 10/1951 | Thelander |
| 2,774,448 A | 12/1956 | Hultin |
| 2,894,742 A | 7/1959 | Peterson |
| 2,944,639 A | 7/1960 | Blake |
| 3,001,538 A | 9/1961 | Du |
| 3,039,761 A | 6/1962 | Zijp |
| 3,085,771 A | 4/1963 | Peterson |
| 3,086,786 A | 4/1963 | Tuczek |
| 3,114,705 A | 12/1963 | Prihonic et al. |
| 3,146,862 A | 9/1964 | Winsen |
| 3,201,110 A | 8/1965 | Taccone |
| 3,202,413 A | 8/1965 | Colmerauer |
| 3,237,726 A | 3/1966 | Deyerling |
| 3,319,741 A | 5/1967 | Hauck |
| 3,338,347 A | 8/1967 | Avner |
| 3,379,430 A | 4/1968 | Hennells |
| 3,414,092 A | 12/1968 | Speckhart |
| 3,711,054 A | 1/1973 | Bauer |
| 3,722,875 A | 3/1973 | Hasse |
| 3,836,132 A | 9/1974 | McNally et al. |
| 3,854,710 A | 12/1974 | Nicholls |
| 3,856,287 A | 12/1974 | Freitag |
| 3,873,122 A | 3/1975 | Fischer |
| 3,889,934 A | 6/1975 | Kamman |
| 3,970,292 A | 7/1976 | Dachicourt et al. |
| RE29,055 E | 11/1976 | Wagner |
| 4,029,306 A | 6/1977 | Sakaguchi et al. |
| 4,122,923 A | 10/1978 | Ellis et al. |
| 4,132,395 A | 1/1979 | Fox |
| 4,145,067 A | 3/1979 | Ceriani |
| 4,153,266 A | 5/1979 | Uhls |
| 4,159,105 A | 6/1979 | Vander Laan et al. |
| 4,159,756 A | 7/1979 | Murakami et al. |
| 4,206,934 A | 6/1980 | McKee |
| 4,254,849 A | 3/1981 | Pohlenz |
| 4,256,293 A | 3/1981 | Burgess |
| 4,273,310 A | 6/1981 | Ginzler |
| 4,295,658 A | 10/1981 | Kashima |
| 4,298,101 A | 11/1981 | Dressell et al. |
| 4,313,529 A | 2/1982 | Kato et al. |
| 4,325,541 A | 4/1982 | Korosladanyi et al. |
| 4,334,600 A | 6/1982 | Palitto |
| 4,337,849 A | 7/1982 | Siorek et al. |
| 4,386,766 A | 6/1983 | Bauer et al. |
| 4,390,159 A | 6/1983 | Duncan |
| 4,405,119 A | 9/1983 | Masclet et al. |
| 4,438,909 A | 3/1984 | Matsumoto |
| 4,452,117 A | 6/1984 | Brickner et al. |
| 4,457,340 A | 7/1984 | Krueger |
| 4,492,290 A | 1/1985 | Zavodny |
| 4,509,730 A | 4/1985 | Shtarkman |
| 4,527,676 A | 7/1985 | Emura et al. |
| 4,530,425 A | 7/1985 | Veaux et al. |
| 4,534,580 A | 8/1985 | Kobayashi et al. |
| 4,558,587 A | 12/1985 | Fruzzetti |
| 4,572,317 A | 2/1986 | Isono et al. |
| 4,576,258 A | 3/1986 | Spisak et al. |
| 4,591,186 A | 5/1986 | Ashiba |
| 4,592,540 A | 6/1986 | Yokoya et al. |
| 4,598,929 A | 7/1986 | Kumagai et al. |
| 4,606,440 A | 8/1986 | Buchanan et al. |
| 4,613,116 A | 9/1986 | Buma |
| 4,616,811 A | 10/1986 | Buma |
| 4,620,619 A | 11/1986 | Emura et al. |
| 4,629,170 A | 12/1986 | Warmuth |
| 4,631,116 A | 12/1986 | Ludwig |
| 4,635,906 A | 1/1987 | Buma |
| 4,647,069 A | 3/1987 | Iijima |
| 4,650,202 A | 3/1987 | Tsuzuki |
| 4,650,212 A | 3/1987 | Yoshimura |
| 4,651,977 A | 3/1987 | Buma |
| 4,653,735 A | 3/1987 | Buma |
| 4,659,070 A | 4/1987 | Buma |
| 4,660,688 A | 4/1987 | Spisak et al. |
| 4,660,810 A | 4/1987 | Buma |
| 4,666,135 A | 5/1987 | Buma et al. |
| 4,667,696 A | 5/1987 | Van |
| 4,671,534 A | 6/1987 | Yano |
| 4,673,171 A | 6/1987 | Buma |
| 4,686,135 A | 8/1987 | Obayashi et al. |
| 4,686,626 A | 8/1987 | Kuroki et al. |
| 4,697,796 A | 10/1987 | Kitamura et al. |
| 4,717,173 A | 1/1988 | Sugasawa et al. |
| 4,735,401 A | 4/1988 | Buma et al. |
| 4,741,554 A | 5/1988 | Okamoto |
| 4,743,000 A | 5/1988 | Karnopp |
| 4,746,106 A | 5/1988 | Fukumura |
| 4,768,758 A | 9/1988 | Buma |
| 4,773,635 A | 9/1988 | Buma |
| 4,787,644 A | 11/1988 | Yokote et al. |
| 4,789,051 A | 12/1988 | Kruckemeyer et al. |
| 4,827,416 A | 5/1989 | Kawagoe et al. |
| 4,828,464 A | 5/1989 | Maier et al. |
| 4,838,306 A | 6/1989 | Horn et al. |
| 4,844,428 A | 7/1989 | Margolis et al. |
| 4,899,853 A | 2/1990 | Hummel |
| 4,901,986 A | 2/1990 | Smith |
| 4,915,364 A | 4/1990 | Perlini |
| 4,917,222 A | 4/1990 | Simon Bacardit |
| 4,936,423 A | 6/1990 | Karnopp |
| 4,936,424 A | 6/1990 | Costa |
| 4,944,705 A | 7/1990 | Kashima et al. |
| 4,948,104 A | 8/1990 | Wirges |
| 4,958,706 A | 9/1990 | Richardson et al. |
| 4,974,820 A | 12/1990 | Nakanishi |
| 4,993,523 A | 2/1991 | Schwemmer et al. |
| 4,999,872 A | 3/1991 | Jentsch |
| 5,037,062 A | 8/1991 | Neuhaus |

(56) References Cited

U.S. PATENT DOCUMENTS

| | | | |
|---|---|---|---|
| 5,067,517 A | 11/1991 | Ting-Chih et al. |
| 5,067,518 A | 11/1991 | Kosmyna |
| 5,072,813 A | 12/1991 | Yoshioka et al. |
| 5,080,205 A | 1/1992 | Miller et al. |
| 5,111,735 A | 5/1992 | Johnson |
| 5,139,119 A | 8/1992 | Karnopp |
| 5,150,775 A | 9/1992 | Charles et al. |
| 5,158,270 A | 10/1992 | Lin |
| 5,163,538 A | 11/1992 | Derr et al. |
| 5,169,129 A | 12/1992 | Hoffman |
| 5,180,186 A | 1/1993 | Charles et al. |
| 5,186,481 A | 2/1993 | Turner |
| 5,201,388 A | 4/1993 | Malm |
| 5,201,389 A | 4/1993 | Miller et al. |
| 5,228,640 A | 7/1993 | Mouille |
| 5,251,927 A | 10/1993 | Charles et al. |
| 5,275,264 A | 1/1994 | Isella |
| 5,279,480 A | 1/1994 | Derrien et al. |
| 5,285,875 A | 2/1994 | Munoz |
| 5,285,876 A | 2/1994 | Shimizu et al. |
| 5,296,089 A | 3/1994 | Chen et al. |
| 5,306,122 A | 4/1994 | Gebauer et al. |
| 5,332,068 A | 7/1994 | Richardson et al. |
| 5,346,236 A | 9/1994 | Ohma |
| 5,360,089 A | 11/1994 | Nakamura et al. |
| 5,386,893 A | 2/1995 | Feigel |
| 5,396,973 A | 3/1995 | Schwemmer et al. |
| 5,404,972 A | 4/1995 | Popjoy et al. |
| 5,413,316 A | 5/1995 | Easter |
| 5,428,533 A | 6/1995 | Ogawa |
| 5,449,188 A | 9/1995 | Ohma |
| 5,456,480 A | 10/1995 | Turner et al. |
| 5,462,140 A | 10/1995 | Cazort et al. |
| 5,470,090 A | 11/1995 | Stewart et al. |
| 5,509,674 A | 4/1996 | Browning |
| 5,529,152 A | 6/1996 | Hamilton et al. |
| 5,533,597 A | 7/1996 | Nezu et al. |
| 5,538,276 A | 7/1996 | Tullis |
| 5,585,876 A | 12/1996 | Kobayashi |
| 5,586,781 A | 12/1996 | Anderson |
| 5,598,903 A | 2/1997 | Richardson |
| 5,632,471 A | 5/1997 | Pradel |
| 5,653,315 A | 8/1997 | Ekquist et al. |
| 5,725,226 A | 3/1998 | Cabrerizo-Pariente et al. |
| 5,775,677 A | 7/1998 | Englund |
| 5,799,758 A | 9/1998 | Huang |
| 5,803,482 A | 9/1998 | Kim |
| 5,823,305 A | 10/1998 | Richardson et al. |
| 5,842,688 A | 12/1998 | Dore et al. |
| 5,862,895 A | 1/1999 | Ricard |
| 5,915,674 A | 6/1999 | Wolf et al. |
| 5,921,572 A | 7/1999 | Bard et al. |
| 5,954,167 A | 9/1999 | Richardson et al. |
| 5,957,252 A | 9/1999 | Berthold |
| 5,971,116 A | 10/1999 | Franklin |
| 5,996,978 A | 12/1999 | Asanuma et al. |
| 6,010,119 A | 1/2000 | Hsiao |
| 6,029,958 A | 2/2000 | Larsson et al. |
| 6,050,583 A | 4/2000 | Bohn |
| 6,073,736 A | 6/2000 | Franklin |
| 6,095,541 A | 8/2000 | Turner et al. |
| 6,105,987 A | 8/2000 | Turner |
| 6,105,988 A | 8/2000 | Turner et al. |
| 6,109,400 A | 8/2000 | Ayyildiz et al. |
| 6,119,830 A | 9/2000 | Richardson et al. |
| 6,135,434 A | 10/2000 | Marking |
| 6,149,125 A | 11/2000 | Nilsson |
| 6,149,174 A | 11/2000 | Bohn |
| 6,234,461 B1 | 5/2001 | Böhm et al. |
| 6,254,067 B1 | 7/2001 | Yih |
| 6,267,400 B1 | 7/2001 | McAndrews |
| 6,279,703 B1 | 8/2001 | Mete |
| 6,296,092 B1 | 10/2001 | Marking et al. |
| 6,311,962 B1 | 11/2001 | Marking |
| 6,318,525 B1 | 11/2001 | Vignocchi et al. |
| 6,334,600 B1 | 1/2002 | Sakamoto |
| 6,340,153 B1 | 1/2002 | Miesner |
| 6,343,807 B1 | 2/2002 | Rathbun |
| 6,360,857 B1 | 3/2002 | Fox et al. |
| 6,386,525 B1 | 5/2002 | Stuart |
| 6,412,615 B1 | 7/2002 | Perez |
| 6,412,759 B1 | 7/2002 | Krauss |
| 6,415,895 B2 | 7/2002 | Marking et al. |
| 6,457,730 B1 | 10/2002 | Urbach |
| 6,464,053 B1 | 10/2002 | Hoebrechts |
| 6,464,201 B2 | 10/2002 | Job |
| 6,467,592 B1 | 10/2002 | Dernebo |
| 6,491,146 B1 | 12/2002 | Yi et al. |
| 6,505,719 B2 | 1/2003 | Gonzalez et al. |
| 6,508,460 B2 | 1/2003 | Job |
| 6,543,754 B2 | 4/2003 | Ogura |
| 6,543,799 B2 | 4/2003 | Miyoshi |
| 6,581,948 B2 | 6/2003 | Fox |
| 6,592,136 B2 | 7/2003 | Becker et al. |
| 6,595,537 B2 | 7/2003 | Miyoshi et al. |
| 6,604,751 B2 | 7/2003 | Fox |
| 6,612,599 B2 | 9/2003 | Miyoshi |
| 6,619,684 B2 | 9/2003 | Miyoshi |
| 6,648,109 B2 | 11/2003 | Farr et al. |
| 6,659,240 B2 | 12/2003 | Dernebo |
| 6,659,241 B2 | 12/2003 | Sendrea |
| 6,669,219 B2 | 12/2003 | Turner et al. |
| 6,688,626 B2 | 2/2004 | Felsl et al. |
| 6,698,730 B2 | 3/2004 | Easter |
| 6,698,780 B2 | 3/2004 | Miyoshi |
| 6,708,803 B2 | 3/2004 | Jensen |
| 6,708,999 B1 | 3/2004 | Baltes et al. |
| 6,722,678 B2 | 4/2004 | McAndrews |
| 6,786,498 B1 | 9/2004 | Chang |
| 6,824,146 B2 | 11/2004 | Kang |
| 6,824,154 B1 | 11/2004 | Turner |
| 6,863,291 B2 | 3/2005 | Miyoshi |
| 6,866,281 B2 | 3/2005 | Chamberlain et al. |
| 6,883,650 B2 | 4/2005 | Van Wonderen et al. |
| 6,883,810 B2 | 4/2005 | Svartz et al. |
| 6,938,887 B2 | 9/2005 | Achenbach |
| 6,974,001 B2 | 12/2005 | Bauman |
| 6,976,692 B2 | 12/2005 | Miyoshi et al. |
| 6,978,872 B2 | 12/2005 | Turner |
| 6,991,076 B2 | 1/2006 | McAndrews |
| 6,991,621 B2 | 1/2006 | Bacher et al. |
| 7,000,907 B2 | 2/2006 | Achenbach |
| 7,011,193 B2 | 3/2006 | Lemmens et al. |
| 7,011,325 B2 | 3/2006 | Kinzler et al. |
| 7,017,893 B1 | 3/2006 | Vincenzo |
| 7,017,928 B2 | 3/2006 | Felsl et al. |
| 7,021,434 B2 | 4/2006 | Beck |
| 7,128,192 B2 | 10/2006 | Fox |
| 7,163,223 B2 | 1/2007 | Wesling et al. |
| 7,182,358 B2 | 2/2007 | Felsl et al. |
| 7,188,712 B2 | 3/2007 | Vogelsang et al. |
| 7,195,234 B2 | 3/2007 | Jordan et al. |
| 7,219,881 B2 | 5/2007 | Denk |
| 7,299,908 B2 | 11/2007 | Achenbach |
| 7,374,028 B2 | 5/2008 | Fox |
| 7,401,800 B2 | 7/2008 | Jordan |
| 7,441,638 B2 | 10/2008 | Hanawa |
| 7,641,028 B2 | 1/2010 | Fox |
| 7,703,585 B2 | 4/2010 | Fox |
| 7,870,936 B2 | 1/2011 | Shipman |
| 7,963,509 B2 | 6/2011 | Fox et al. |
| 8,464,850 B2 | 6/2013 | Fox |
| 8,752,681 B2 | 6/2014 | Fox |
| 9,415,653 B2 | 8/2016 | Franklin et al. |
| 9,567,029 B2 | 2/2017 | Fox |
| 9,802,670 B2 | 10/2017 | Fox |
| 2002/0117830 A1 | 8/2002 | Holt et al. |
| 2002/0175035 A1 | 11/2002 | Achenbach |
| 2003/0234144 A1 | 12/2003 | Fox |
| 2004/0020730 A1 | 2/2004 | Turner |
| 2004/0061303 A1 | 4/2004 | Felsl et al. |
| 2004/0094376 A1 | 5/2004 | Van Wonderen et al. |
| 2004/0163905 A1 | 8/2004 | Braswell et al. |
| 2004/0222056 A1 | 11/2004 | Fox |

(56) References Cited

U.S. PATENT DOCUMENTS

| | | |
|---|---|---|
| 2004/0232650 A1 | 11/2004 | Felsl et al. |
| 2004/0245746 A1 | 12/2004 | Chamberlain et al. |
| 2004/0262879 A1 | 12/2004 | Kinzler et al. |
| 2005/0012255 A1 | 1/2005 | Denk |
| 2005/0012297 A1 | 1/2005 | Miyoshi et al. |
| 2005/0023094 A1 | 2/2005 | McAndrews |
| 2005/0056501 A1 | 3/2005 | De Molina |
| 2005/0104320 A1 | 5/2005 | Wesling et al. |
| 2005/0116399 A1 | 6/2005 | Jordan et al. |
| 2005/0173212 A1 | 8/2005 | Vogelsang et al. |
| 2005/0212187 A1 | 9/2005 | Achenbach |
| 2006/0289258 A1 | 12/2006 | Fox |
| 2007/0057420 A1 | 3/2007 | Jordan et al. |
| 2007/0090624 A1 | 4/2007 | Chen |
| 2008/0116622 A1 | 5/2008 | Fox |
| 2008/0179796 A1 | 7/2008 | Fox |
| 2008/0290571 A1 | 11/2008 | Krauss |
| 2008/0296814 A1 | 12/2008 | Franklin et al. |
| 2011/0204549 A1 | 8/2011 | Fox et al. |
| 2016/0348747 A1 | 12/2016 | Franklin et al. |
| 2018/0057100 A1 | 3/2018 | Fox |

FOREIGN PATENT DOCUMENTS

| | | |
|---|---|---|
| DE | 1455159 A1 | 3/1969 |
| DE | 3233160 A1 | 3/1984 |
| DE | 4018712 A1 | 12/1991 |
| DE | 4123643 A1 | 6/1992 |
| DE | 4429562 A1 | 2/1996 |
| DE | 10236621 A1 | 3/2004 |
| DE | 102004021586 A1 | 12/2005 |
| EP | 101589 A1 | 2/1984 |
| EP | 164189 A1 | 12/1985 |
| EP | 166702 A2 | 1/1986 |
| EP | 245221 A2 | 11/1987 |
| EP | 342683 A2 | 11/1989 |
| EP | 420610 A1 | 4/1991 |
| EP | 474171 A1 | 3/1992 |
| EP | 541891 A1 | 5/1993 |
| EP | 666803 A1 | 8/1995 |
| EP | 834448 A2 | 4/1998 |
| EP | 1464866 A2 | 10/2004 |
| ES | 8608123 A1 | 11/1986 |
| FI | 931949 A | 4/1993 |
| FR | 1174491 A | 3/1959 |
| FR | 2725948 A1 | 4/1996 |
| FR | 2728948 A1 | 7/1996 |
| FR | 2753510 A1 | 3/1998 |
| FR | 2800902 A1 | 5/2001 |
| FR | 2863328 A1 | 6/2005 |
| FR | 2866628 A1 | 8/2005 |
| GB | 835151 A | 5/1960 |
| GB | 865151 A | 4/1961 |
| GB | 2265435 A | 9/1993 |
| GB | 2286566 A | 8/1995 |
| IT | 1237933 B | 6/1993 |
| IT | 1247985 B | 1/1995 |
| JP | 5701008509 A | 1/1982 |
| JP | 57018509 Y2 | 4/1982 |
| JP | 59026639 B | 6/1984 |
| JP | 61135808 A | 6/1986 |
| JP | 61235212 A | 10/1986 |
| JP | 61235215 A | 10/1986 |
| JP | 07167189 A | 7/1995 |
| SU | 623759 A1 | 9/1978 |
| WO | 9323283 A2 | 11/1993 |
| WO | 9903726 A1 | 1/1999 |
| WO | 9910223 A1 | 3/1999 |
| WO | 9914104 A1 | 3/1999 |
| WO | 9925989 A2 | 5/1999 |
| WO | 9958392 A1 | 11/1999 |
| WO | 0238437 A1 | 5/2002 |
| WO | 03029687 A1 | 4/2003 |
| WO | 2004016966 A1 | 2/2004 |
| WO | 2004041563 A1 | 5/2004 |
| WO | 2005108818 A1 | 11/2005 |

OTHER PUBLICATIONS

Fox Twin-Clicker Owner's Manual, Dec. 1981.
Listing of Forks, undated, unidentified, 1987-1991.
Office Action dated Feb. 26, 2009, U.S. Appl. No. 11/372,707.
Road Bike Action—"Rock Shox on the Road to Roubaix", Aug. 1993, pp. 28-34 and 101.
Road Bike, Aug. 1993.
Specification and drawing of Application—11372707.
U.S. Appl. No. 11/372,707, filed Mar. 10, 2006.
"Bici Da Montagna—"Carraro 499 Piccante"", Bici Da Montagna—"Carraro 499 Piccante" (article in Italian), Mar. 1994.
"Bicycling", Bicycling—Aug. 1993.
"Bike Pulse—"Rock Shock President Bryan Kelln"", Bike Pulse—"Rock Shock President Bryan Kelln", May 2000 (pp. 4-6 and 8), pp. 4-6 and 8.
"Bycicle Guide—"Suspension's Great for Paris-Roubaix, But Does it Do for Me?"", Bycicle Guide—"Suspension's Great for Paris-Roubaix, But Does it Do for Me?", Jul. 1994, (pp. 29-32, and 39), pp. 29-32, and 39.
"Cane Creek", Cane Creek—AD-10 and AD-12 literature (6 pages).
"Cannodale documents", Cannodale documents—various articles dated 1993 and undated.
"Ceriani", Ceriani—various articles, undated.
"Fox", FOX—various articles—Motocross Action Dec. 1981; Fox Factory 1983; Moto-X Fox 1981; Vanilla Float 1998; Mountain biking Oct. 1998; Cycle World Dec. 1981; undated.
"Fox Factory", Fox Factory—DHX, Fox Factory 2008 Aftermarket Catalog (2 pages).
"Marzocchi literature—"Marzocchi '95: The Going Gets Rough"; "We Are the Champions"", Marzocchi literature—"Marzocchi '95: The Going Gets Rough"; "We Are the Champions", undated.
"Maverick American", Maverick American—Paul Turner, profile (7 pages), Spring 2004.
"Motorcycle Cruiser—"How to Improve the Ride and Suspension Performance of Cruiser Motorcycles"", Motorcycle Cruiser—"How to Improve the Ride and Suspension Performance of Cruiser Motorcycles", www.motorcyclecruiser.com/tech/improve_ride_suspension_performance, 2006 (2 pages).
"Motoxcross Museum—"The History of Fox Air Shocks"", Motoxcross Museum—"The History of Fox Air Shocks", 2001 (9 pages).
"Mountain Bike—"The History of the Revolution"", Mountain Bike—"The History of the Revolution", Aug. 2001 (pp. 34-34, 38, 40, 42); "Fork it over" (p. 12).
"Mountain Bike Action", Mountain Bike Action—various articles dated Feb. 1992, Jan. 1993, Nov. 1991, Jan. 1993, Dec. 1997, and Feb. 1991.
"Mountain Biking", Mountain Biking—Bulletin Board, "Smart Like a Fox", Oct. 1996 (p. 16), p. 16.
"Risee Racing Technology—"Remote Adjustable Air Chamber"", Risee Racing Technology—"Remote Adjustable Air Chamber", Webpage 1999/2005 (2 pages).
"Rock Shock Documents", Rock Shock Documents—various articles dated 1993, 1996-1998, 2000, 2004.
"Rock Shox", Rock Shox—Basic SID rear shock dimensional drawings (2 pages).
"Rock Shox", Rock Shox—Fork SID Manuals, 1998-2000 (15 pages).
"Rock Shox", Rock Shox—Shock SID Manuals.
"Showa Advertisement", Showa Advertisement—Mountain Bike, Jun. 22-23, 1994 (3 pages).
"Sospensioni", Sospensioni—article in Italian, 1993, (p. 27), p. 27.
"Sport Rider—"Suspension Tuning Guide—Learning the Lingo"", Sport Rider—"Suspension Tuning Guide—Learning the Lingo", www.sportrider.com/tech/146.0006.susp_lingo (2 pages).
"Tutto Mountain Bike—"Turro Meteor"", Tutto Mountain Bike—"Turro Meteor" (article in Italian), Sep. 1992 (p. 57), p. 57.

(56) References Cited

OTHER PUBLICATIONS

Gieck, "Riding on Air: A History of Air suspension, Society of Automotive Engineers", Riding on Air: A History of Air suspension, Society of Automotive Engineers, Inc., 1999 (p. 222), p. 222.
Rosso, ""How to Set KTM Fork Oil Level"", Rosso, Mike—"How to Set KTM Fork Oil Level", www.4Strokes.com (1 page).
Sieman, ""Do it Yourself Tech—Dial in Your Forks"", Sieman, Rick—"Do it Yourself Tech—Dial in Your Forks", www.off-road.com/dirtbike/tech/forks, Jul. 1, 2005 (6 pages).
"Rockshox 1998 SID User's Manual ("Air Damping Orifice Adjuster")".

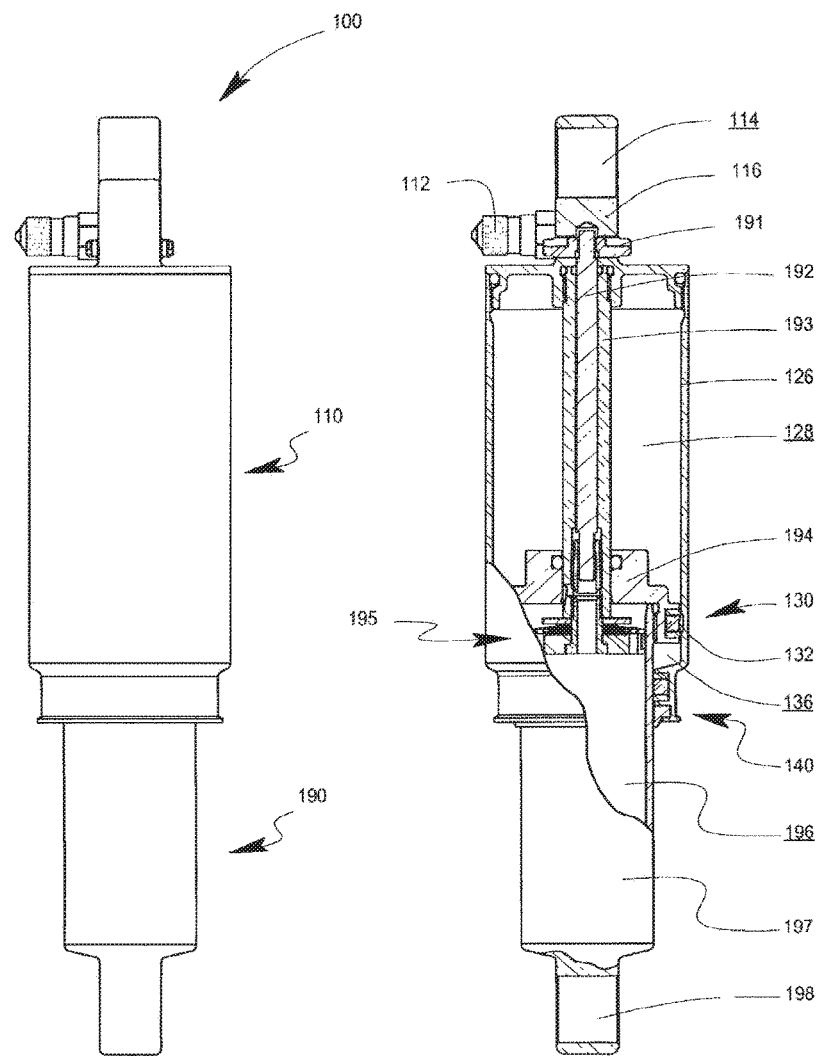

INTEGRATED AND SELF-CONTAINED SUSPENSION ASSEMBLY HAVING AN ON-THE-FLY ADJUSTABLE AIR SPRING

CROSS-REFERENCE TO RELATED APPLICATIONS

This application is a continuation application of and claims priority to and benefit of co-pending U.S. patent application Ser. No. 14/271,395 filed on May 6, 2014 entitled "INTEGRATED AND SELF-CONTAINED SUSPENSION ASSEMBLY HAVING AN ON-THE-FLY ADJUSTABLE AIR SPRING" by Robert C. Fox, assigned to the assignee of the present application, and incorporated herein, in its entirety, by reference.

The application Ser. No. 14/271,395 is a continuation application of and claims priority to and benefit of U.S. patent application Ser. No. 12/768,523, now U.S. Pat. No. 8,752,681, filed on Apr. 27, 2010 entitled "INTEGRATED AND SELF-CONTAINED SUSPENSION ASSEMBLY HAVING AN ON-THE-FLY ADJUSTABLE AIR SPRING" by Robert C. Fox, assigned to the assignee of the present application, and incorporated herein, in its entirety, by reference.

The application Ser. No. 12/768,523 is a continuation application of and claims priority to and benefit of U.S. patent application Ser. No. 10/237,333, now U.S. Pat. No. 7,703,585, filed on Sep. 5, 2002 entitled "INTEGRATED AND SELF-CONTAINED SUSPENSION ASSEMBLY HAVING AN ON-THE-FLY ADJUSTABLE AIR SPRING" by Robert C. Fox, assigned to the assignee of the present application, and incorporated herein, in its entirety, by reference.

The application Ser. No. 10/237,333 claims priority to and benefit of U.S. provisional patent application 60/392,802, filed Jun. 28, 2002 entitled "ON-THE-FLY ADJUSTABLE AIR SPRING", by Robert C. Fox, assigned to the assignee of the present application, and is incorporated herein, in its entirety, by reference.

The application Ser. No. 10/237,333 claims priority to and benefit of U.S. provisional patent application 60/391,991, filed Jun. 25, 2002 entitled "ON-THE-FLY ADJUSTABLE AIR SPRING", by Robert C. Fox, assigned to the assignee of the present application, and is incorporated herein, in its entirety, by reference.

BACKGROUND OF THE INVENTION

Field of the Invention

A preferred embodiment relates to air springs for vehicle suspensions and preferably two-wheeled vehicle suspensions, such as the suspensions of bicycles, which are typically mounted between the chassis of the vehicle and a wheel. In particular, a preferred embodiment relates to an air spring, optionally combined with a shock absorber or other damper to form an integrated suspension unit, which permits instant selection between two different spring rate curves by simply rotating an external knob one-quarter turn.

Description of the Related Art

One advantage of air springs is the ability to change spring rate ("softer" or "stiffer") simply by adjusting the internal air pressure. Such a method permits changing the spring rate curve of an air spring, and is available for essentially all air springs. On many air springs this is accomplished relatively easily by pressurizing or de-pressurizing the air spring with a hand pump and gauge, or by using an air pressure hose at an automobile service station ("gas station"). Most air springs are purposely designed with a standardized Schrader air valve (similar to those in automobile tires) to make this relatively easy and convenient.

As is known in the art, spring rate characteristics can also be changed by altering the initial air chamber volume. Increasing or decreasing initial air chamber volume softens or stiffens, respectively, the air spring curve.

Conventional prior-art air springs for bicycles and motorcycles have been known to provide features for altering air chamber volume. The most common method, used especially in air-sprung mountain bike front forks, is to increase or decrease air chamber volume by adding or removing hydraulic fluid ("changing the oil level"). In other cases, air spring suspension components have been provided with solid, light-weight, "volume plugs". The air spring is opened and the "volume plugs" are added or removed from the air chamber. Both methods, of course, generally require depressurization and opening of the hydraulic unit and/or the air spring.

Another feature known in the art for altering the air chamber volume on certain bicycle and motorcycle air springs has been an adjustable-position threaded cap closing off the air chamber. Threading this cap in or out, which can require a fair amount of torque to overcome frictional forces resulting from the internal pressure, changes the air chamber volume. For example, U.S. Pat. No. 5,346,236 teaches this for a bicycle front fork. Also known in the art is a threaded-cap adjustable-volume external air reservoir which can be added to a basic shock absorber or fork air spring. Changes of this type can typically be accomplished faster than adding or removing hydraulic fluid, and may be accomplished in about 1 minute.

Motorcycles having air suspension with an on-board pressurization system including an on-board air compressor to monitor and regulate air pressure on demand, are also known in the art.

There is a need in bicycles and motorcycles which incorporate air spring suspension for a quick, easy way to alter the air spring curve "on-the-fly". All the prior-art methods noted above suffer from various limitations, including time and effort required, weight, bulk, complexity, and cost.

SUMMARY OF THE INVENTION

One aspect of a preferred embodiment is to provide a suspension air spring, optionally integrated with a shock absorber or other damper, that permits instant selection between "soft" and "firm" spring rate curves by simply turning an external knob one-quarter turn. This is much quicker and easier than other methods provided by conventional prior-art designs. The illustrated embodiments are particularly applicable to bicycles.

In the context of real-world mountain biking, all prior-art methods of changing air spring rates create a significant interruption in the ride, and thus typically are done infrequently, or not at all, during a ride. In contrast, turning an external knob as described according to a preferred embodiment is so quick and simple that it can be done in a routine "on-the-fly" manner dozens of times as desired during a typical ride. Since terrain and trail conditions constantly change, this greatly benefits the rider by enabling him/her to continuously select the best spring rate for the current situation.

The illustrated embodiments achieve this result by partitioning the air spring (more generally, "gas spring") into two separate partial volumes. The two partial volumes are connected by a sealed passage which is selectively opened or closed by turning an external knob. Turning the knob rotates a cam which desirably is in contact with a cam follower. The cam follower then preferably moves a check ball up or down, causing the ball to either seat on or unseat from, respectively, a seal in the connecting passage.

When the check ball is seated, the passage is closed and air flow from the first partial volume to the second partial volume is blocked. This isolates the second partial volume and prevents it from physically participating as a part of the air spring upon compression of the suspension. As is well-known in the art, air spring characteristics depend upon the initial pressure and volume characteristics of the air spring. When the total initial volume is effectively reduced, as occurs here when the passage leading to the second partial volume is blocked, the air spring characteristic ("spring curve") becomes firmer.

When the check ball is unseated, the passage is open and air flow between the two partial volumes is unrestricted. This, of course, makes both partial volumes physically available to the air spring, and results in greater total initial volume and a softer air spring characteristic.

A preferred embodiment is an air spring for a two wheeled vehicle. The air spring being positionable between a vehicle sprung mass and a vehicle wheel. The air spring includes an air cylinder closed at one end and connectable to one of a vehicle sprung mass and a vehicle wheel. A piston is in axially-slideable engagement with the air cylinder and is connectable to the other of a vehicle sprung mass and a vehicle wheel. A partitioning member is positioned within the cylinder and at least partially divides the cylinder into a primary air chamber and a secondary air chamber. A passage connects the primary air chamber and the secondary air chamber and a valve assembly is configured to selectively permit air flow through the passage.

Another preferred embodiment is a gas spring assembly including a body portion and a shaft portion. The shaft portion is telescopingly engaged with the body portion. A piston is carried by the shaft portion and cooperates with the body portion to define a variable volume first gas chamber. One of the shaft portion and the body portion at least partially defines a second gas chamber. A valve assembly is positionable in a first position and a second position. In the first position, the valve assembly substantially prevents communication between the first gas chamber and the second gas chamber and in the second position, the valve assembly permits communication between the first gas chamber and the second gas chamber.

Another aspect of the present invention involves a front suspension fork assembly positionable on a bicycle. The front fork assembly includes a gas spring assembly having a body portion and a shaft portion. The shaft portion is telescopingly engaged with the body portion. A piston is carried by the shaft portion and cooperates with the body portion to define a variable volume first gas chamber. One of the shaft portion and the body portion at least partially defines a second gas chamber. A valve assembly is positionable in a first position and a second position. In the first position, the valve assembly substantially prevents communication between the first gas chamber and the second gas chamber and in the second position, the valve assembly permits communication between the first gas chamber and the second gas chamber. The valve assembly is movable between the first position and the second position by an actuator positioned to be accessible to a hand of a rider of the bicycle while riding.

BRIEF DESCRIPTION OF THE DRAWINGS

FIG. 1 is an overall front view of a prior-art embodiment of a suspension unit consisting of a shock absorber ("damper") integrated with an air spring.

FIG. 2 is a partial sectional front view of the prior-art suspension unit of FIG. 1.

DETAILED DESCRIPTION

Figure 3:
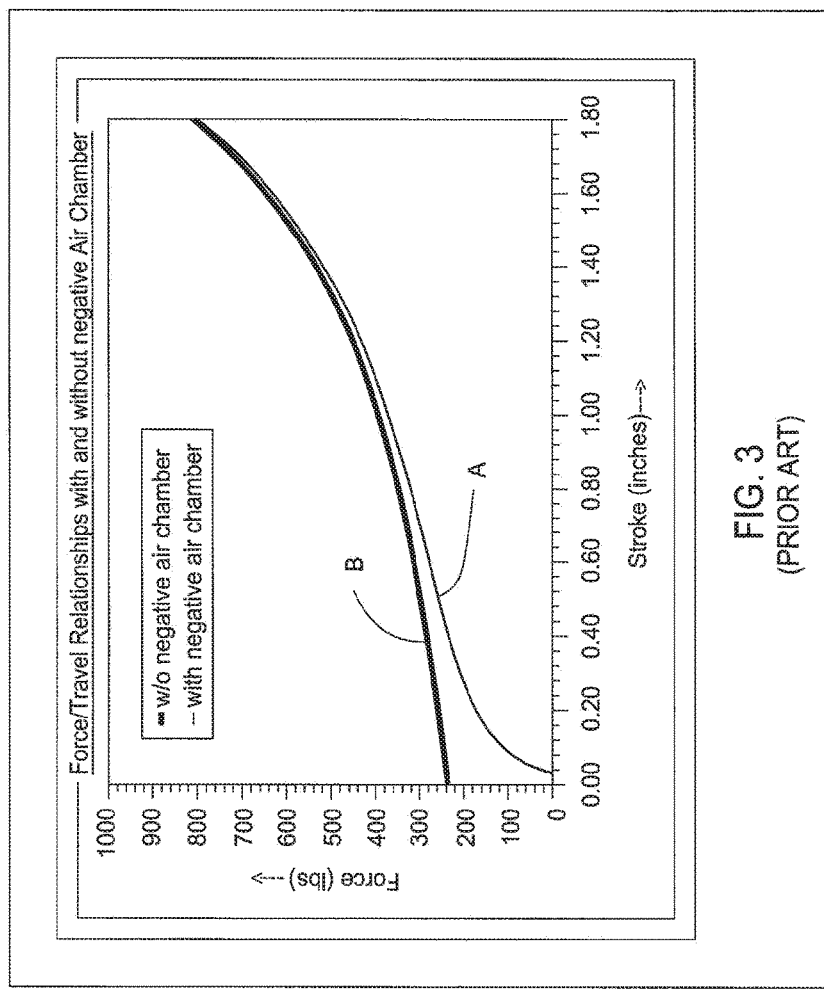
FIG. 3 illustrates the effect of the negative chamber by comparing the spring curve of the prior-art suspension unit of FIG. 2 with the spring curve it would have if the negative chamber was eliminated.

The prior-art integrated suspension unit 100 of FIGS. 1 and 2 will be described first, in order to provide a point of departure for better understanding the improvements of the preferred embodiments, which will be described further on.

The typical prior-art integrated suspension unit 100 as shown in FIGS. 1 and 2 is manufactured by Fox Racing Shox. It is to be understood, of course, that this specific prior-art embodiment is representative only, and that the present air spring arrangement can be applied to other types of suspension units. Additionally, the present air spring arrangement can be applied as a separate air spring unit, not integrated with a damper.

In FIGS. 1 and 2 the integrated suspension unit 100 is comprised of an air spring assembly 110 and a damper assembly 190. The integration is seamless, with several of the components such as an upper eyelet housing 116 and seal head 194 shared by both assemblies and performing dual functional roles. For example, as part of the damper assembly 190, the seal head 194 closes and seals off one end of the shock body 197. At the same time, as part of the air spring assembly 110, the seal head 194 also seals off the open end of the air cylinder 126 and functions as a piston of the air spring assembly 110. The air cylinder 126 functions as a body portion of the air spring assembly 110 and the shock body 197 functions as a shaft portion of the air spring assembly 110.

Still referring to FIGS. 1 and 2, the ends of the integrated suspension unit 100, the upper eyelet 114 and the lower eyelet 198, are connected to the sprung and unsprung portions of the vehicle (not shown) in a conventional manner. The air pressure in the positive air chamber 128 creates a force tending to lengthen the suspension unit 100, while pressure in the negative air chamber 136 tends to shorten it. As is well-known in the art, the net effect of these opposing forces is to create a desirable air spring curve ("force vs. travel curve"), especially in that portion of the travel regime where the suspension unit 100 is near full extension.

In particular, it is well-known that without the counteracting force produced by the negative air chamber 136, which rapidly increases as the shock absorber approaches full extension and the volume of the negative air chamber 136 rapidly decreases, the initial portion of the spring curve ("spring preload") would be quite stiff. Thus, an undesirably large beginning force would be required to initiate the first portion of travel from full extension.

Typical spring curves produced with and without the negative air chamber 136 are illustrated in FIG. 3. Curve "A" shows a force versus travel spring curve that would be produced by the embodiment of FIG. 2, which includes the negative air chamber 136. In contrast, Curve "B" shows the spring curve that would result if the negative air chamber 136 was removed (not shown). On a bicycle, or other vehicle, spring curve "B" would generally produce an undesirably harsh ride due to the large initial force required to initiate travel from full extension.

The positive air chamber 128 is pressurized via the air valve 112. As is typical, an air passage (not shown) is drilled in the upper eyelet housing 116, and leads from the air valve 112 to the positive air chamber 128.

The negative air chamber 136 is pressurized via a transfer port 132. Transfer occurs at that pre-determined point near the beginning of suspension travel where the transfer port 132 bridges the positive/negative seal assembly 130, as depicted in FIG. 2. This air transfer feature provides an effective and simple means for properly balancing the pressures of the positive air chamber 128 and the negative air chamber 136, and is more fully described in U.S. Pat. No. 6,135,434.

The positive/negative seal assembly 130 provides a moving seal between the positive air chamber and the negative air chamber and seals at all times except when bridged by the transfer port 132. The inside bore of the air cylinder 126 is burnished or otherwise finished to provide a smooth, low-friction surface which seals well.

The negative chamber seal assembly 140 seals the lower side of the negative chamber on the outside of the shock body 197, which is burnished or otherwise finished to provide a smooth, low-friction surface which seals well.

The prior-art integrated suspension unit 100 of FIGS. 1 and 2 includes provisions for adjusting the internal damping by rotating a damping adjuster knob 191 which, in turn, rotates the damping adjuster rod 192 which extends down the shaft 193 into the piston assembly 195. This basic construction, available in many conventional high-performance shock absorbers and well-known to those skilled in the art, enables external adjustability of compression damping, rebound damping, or both.

Figure 6:
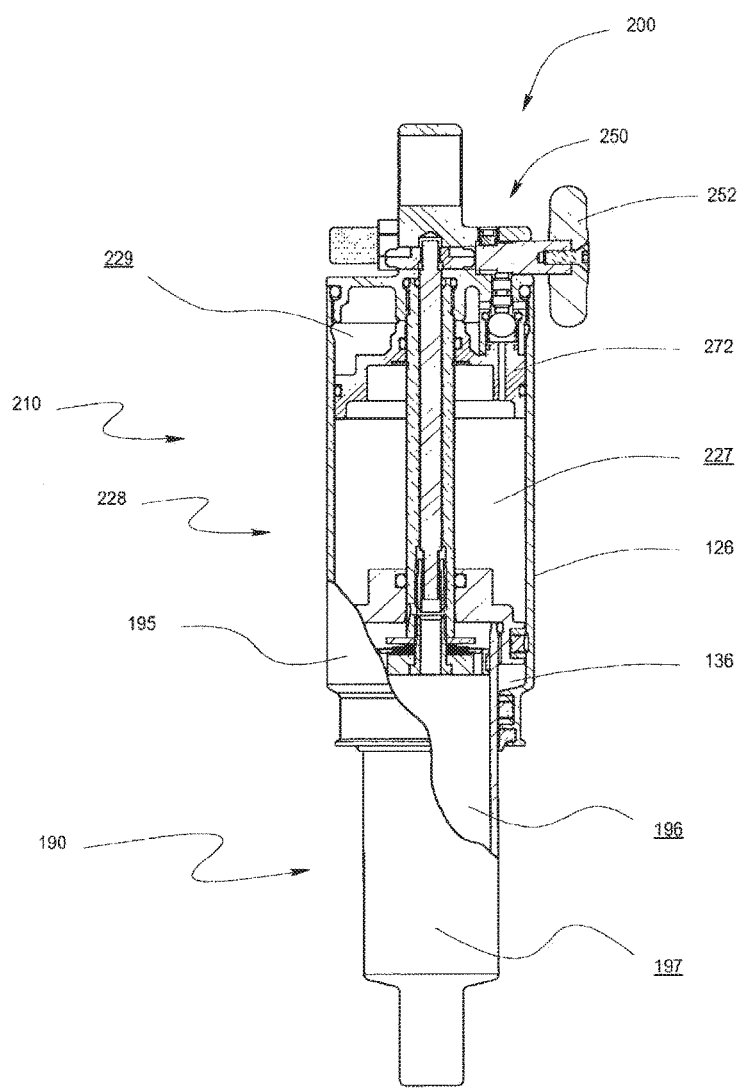
FIG. 6 is a partial sectional front view of the suspension unit of FIG. 4.
Figure 16:
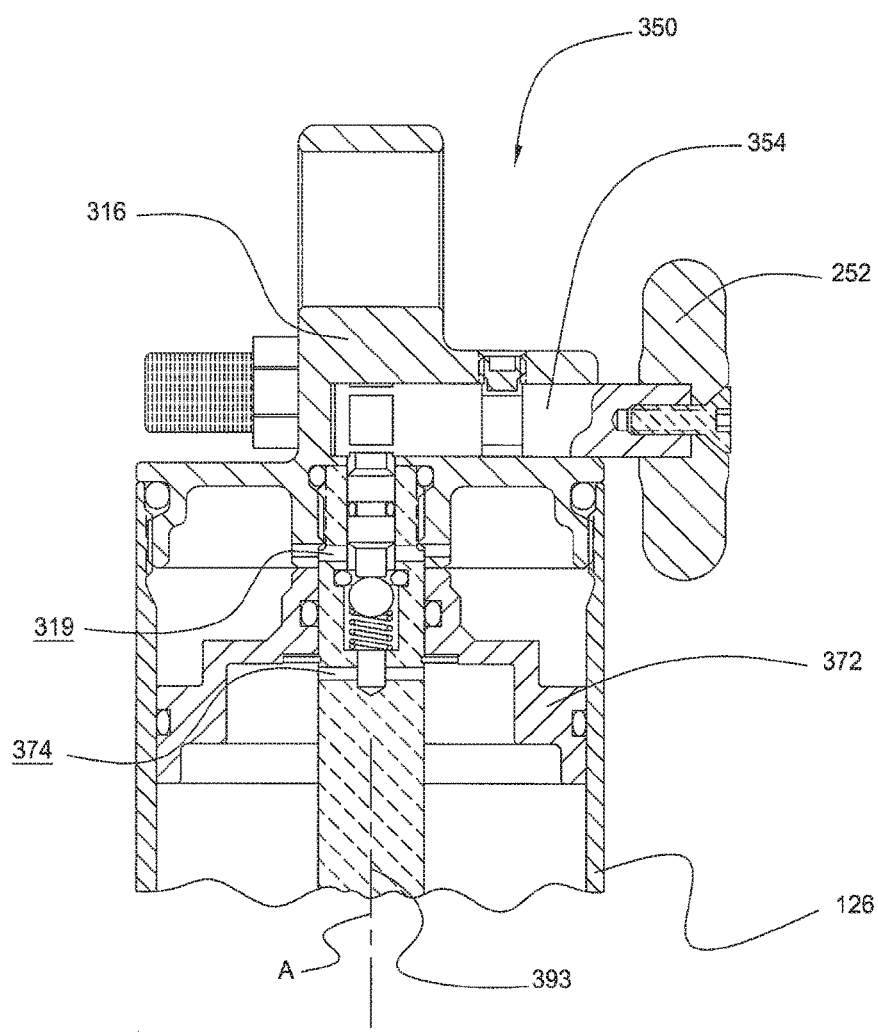
FIG. 16 shows an alternate embodiment of a suspension unit, where the connecting passageway occurs through the center shaft.

Although this damper construction feature is not required for application of the preferred embodiments, it is illustrated here in the prior-art and it is also included in the illustrated embodiment shown in FIG. 6. If this adjustable damping feature is not included, a somewhat simplified and less costly preferred embodiment, as described later and illustrated in FIG. 16, is made possible.

The rest of the prior-art integrated suspension unit 100, including the piston assembly 195 of the damper assembly 190 which creates damping as it moves thru the damping fluid 196, are not illustrated or described in further detail since they are conventional features well-known to those skilled in the art, and are not required for an understanding of the preferred embodiments.

Figures 4, 5:
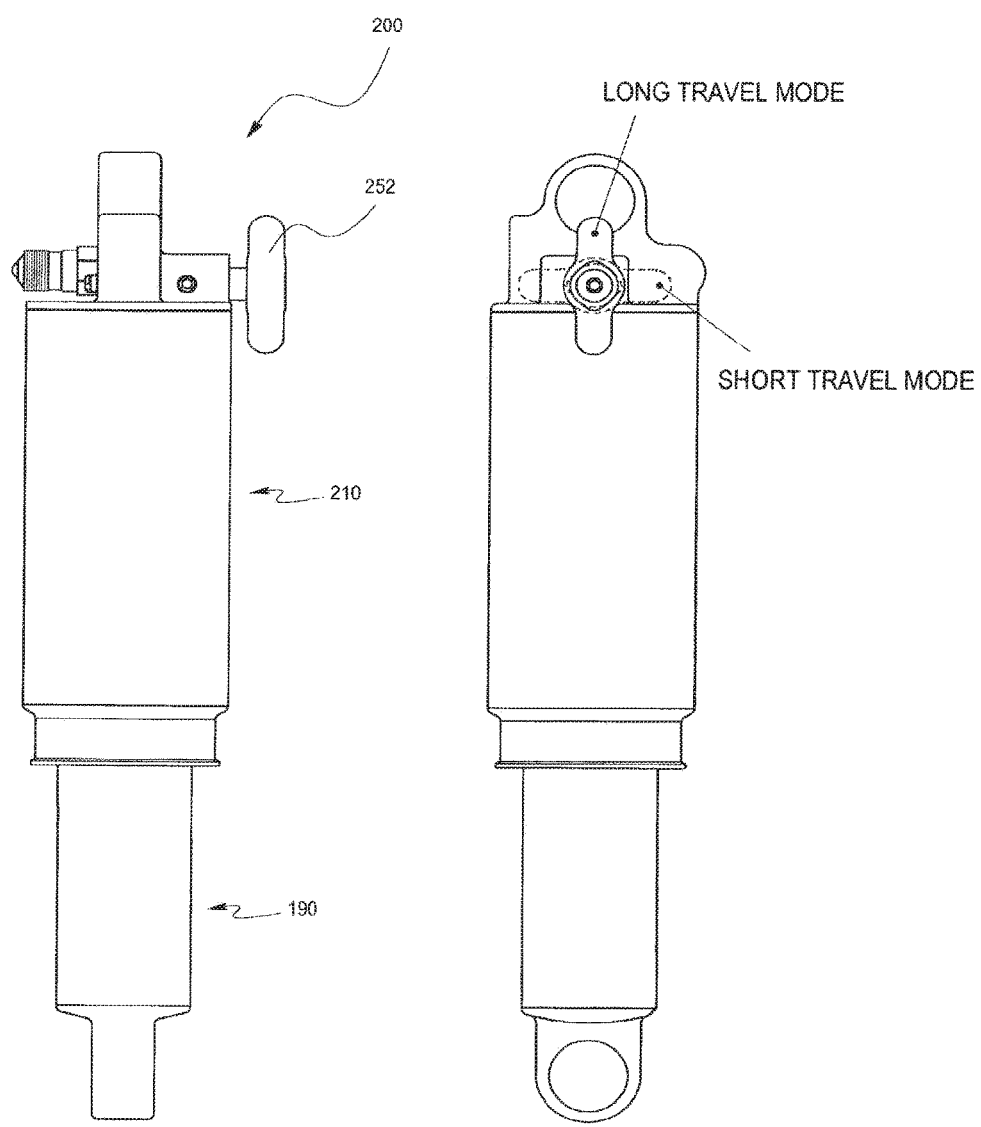
FIG. 4 is an overall front view of a preferred embodiment of a suspension unit.
FIG. 5 is an overall side view of the suspension unit of FIG. 4.

External views of a preferred embodiment are shown in FIGS. 4 and 5. Suspension unit 200 comprises a damper assembly 190 identical to that of FIG. 1, and an adjustable air spring assembly 210. A manually-operable travel adjust lever 252 extends from the upper portion of suspension unit 200. The travel adjust lever 252 can be rotated 90-degrees clockwise or counterclockwise between the two positions shown, the "long-travel mode" and the "short-travel mode", as will be described more fully further on.

FIG. 6 shows a partial sectional view of the suspension unit 200 of FIG. 4. In comparison to the prior-art device of FIGS. 1 and 2, the damper assembly 190 of FIG. 6 is identical to the damper assembly 190 of FIGS. 1 and 2; however, the adjustable air spring assembly 210 of FIG. 6 contains additional structure and modified structure as compared with air spring assembly 110 of FIGS. 1 and 2. The additional and modified structure comprises an air cylinder partition 272 sealed within the air cylinder 126 which separates the divided positive air chamber 228 into a first partial volume 227 and a second partial volume 229, and a travel adjust assembly 250 which enables these two partial volumes to be either connected or separated by rotation of the external travel adjust lever 252.

Figure 7:
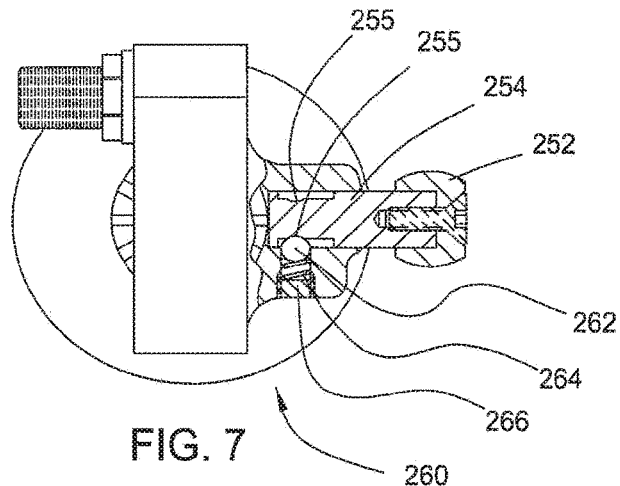
FIG. 7 is a partial sectional top view of the suspension unit of FIG. 6.
Figure 8:
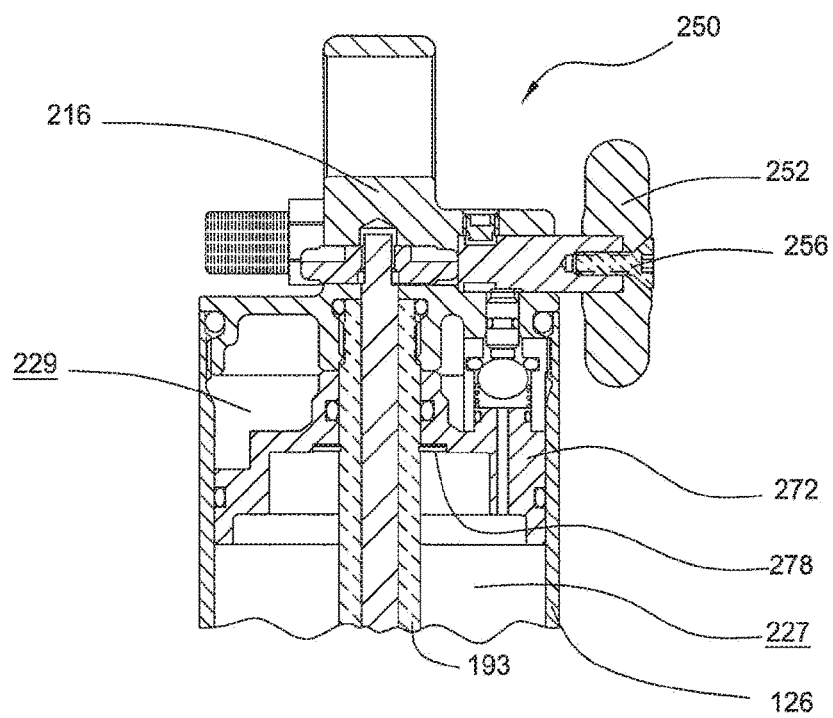
FIG. 8 is an enlarged partial sectional view of the suspension unit of FIG. 6.

FIGS. 7 and 8 show enlarged views illustrating this additional structure and modified structure, which will now be described in detail. In FIG. 8 and other drawings, various seals (such as a conventional O-ring seal between the air cylinder 126 and the air cylinder partition 272) are included in the drawing, but are not numbered or described, since they are conventional features well-known to those skilled in the art.

The detent ball assembly 260 provides a detenting effect such that, after adjustment, the travel adjust lever 252 is held in the selected position. It also provides tactile feedback to the operator to indicate attainment of a new position upon rotation. The travel adjust lever 252 is incorporated into the upper eyelet housing 216 and is secured to an actuating cam shaft 254 by a retaining screw 256. A surface of the actuating cam shaft 254 has a ball indent 255 spaced every 90-degrees on its outer surface near one end. A surface of a detent ball 262, urged by a detent spring 264 which is secured by a detent set screw 266, engages the ball indent 255. Thus, in an engaged position, the detent ball 262 engages one of the ball indents 255 and a first level of resistance to rotation of the travel adjust lever 252 is provided that, desirably, inhibits unintentional rotation of the lever 252, while still allowing the lever 252 to be rotated by hand. In an unengaged position, the detent ball 262 contacts a surface of the cam shaft 254 between the indents 255 and, desirably, provides little or no resistance to rotation of the travel adjust lever 252.

In FIG. 8, the retaining ring 278 serves to secure the axial location of the air cylinder partition 272 on the shaft 193.

Figure 9:
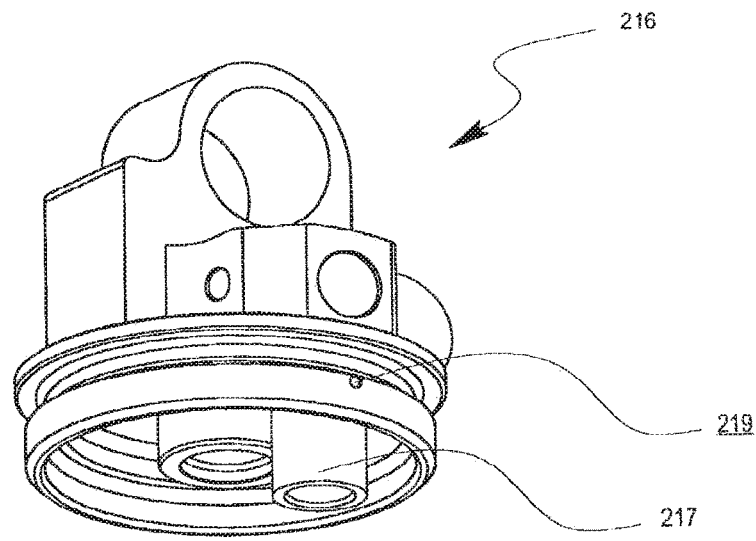
FIG. 9 is an isometric view of the upper eyelet housing of the suspension unit of FIG. 6.
Figure 10:
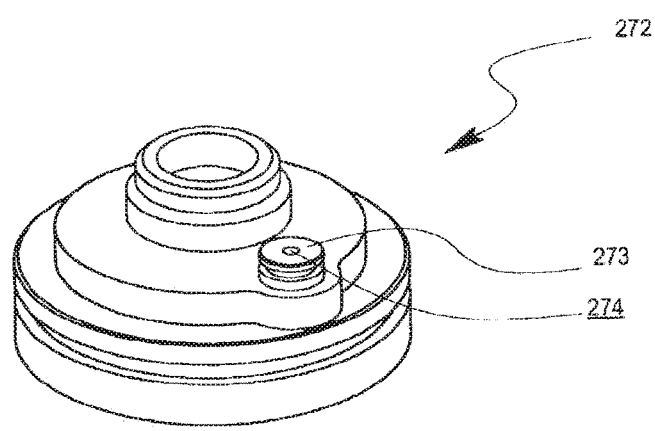
FIG. 10 is an isometric view of the air sleeve partition of the suspension unit of FIG. 6.
Figure 11:
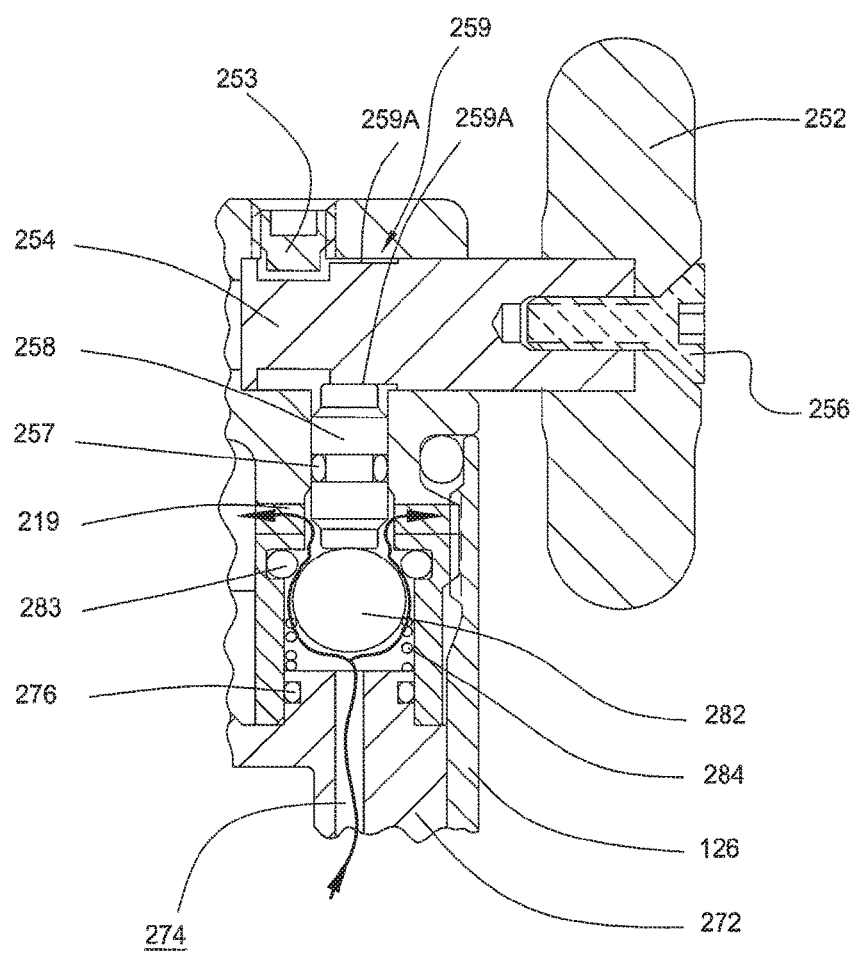
FIG. 11 is an enlarged partial sectional view of the switching mechanism of the suspension unit of FIG. 6, with the adjusting lever set so the air passage is open.

In order to facilitate clear visualization of the interface between the upper eyelet housing 216 and the air cylinder partition 272, FIG. 9 shows an isometric view of the upper eyelet housing 216, and FIG. 10 shows an isometric view of the air cylinder partition 272. As shown, the underside of the upper eyelet housing 216 includes a downwardly-projecting upper passage port coupler 217 which engages the upwardly-projecting lower passage port boss 273 thru which the lower passage port 274 passes. This connection is sealed by a lower passage port seal 276 as shown in FIG. 11. In addition, the upper eyelet housing 216 includes an upper passage port 219, which preferably extends completely through the upper passage port coupler 217, in a direction perpendicular to a longitudinal axis thereof, as shown in FIG. 11.

Figure 12:
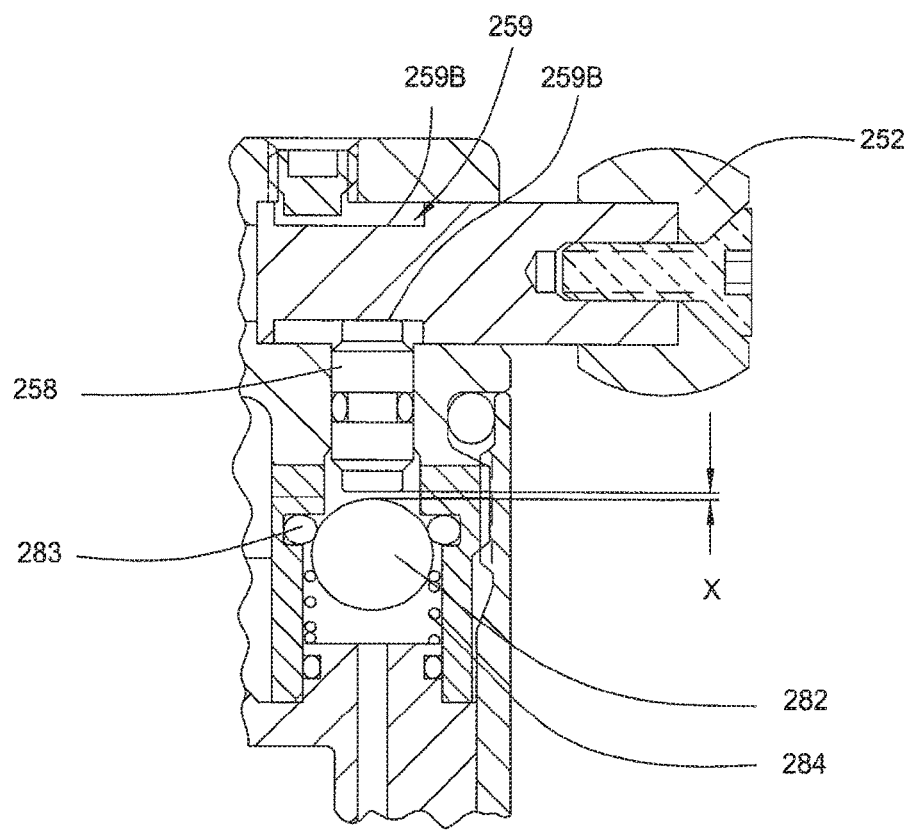
FIG. 12 is an enlarged partial sectional view of the switching mechanism of the suspension unit of FIG. 6, with the adjusting lever set so the air passage is closed.

FIG. 11 shows an enlarged partial sectional view of the travel adjust assembly 250, which is now described in detail. As previously described, the travel adjust lever 252 is secured to the actuating cam shaft 254 by a retaining screw 256. The actuating cam shaft 254 is retained in the upper eyelet housing 216 by a retaining screw 253. The actuating cam shaft 254 includes a cam profile 259. This cam profile 259 consists of 2 flats 259A 180-degrees apart as shown here in FIG. 11, and 2 deeper flats 259B as shown in FIG. 12, which also are 180-degrees apart and are at 90-degrees from flats 259A. These flats control the position of the cam follower 258, as determined by the setting of the travel adjust lever 252. Cam follower 258 is sealed by cam follower seal 257.

With the travel adjust lever 252 in the position shown in FIG. 11, the cam follower 258 is in contact with the check ball 282 and maintains it in a position out of contact with the check ball seal 283. As shown by the heavy flow lines drawn, this enables air flow from the first partial volume 227 (not shown in this view) thru the lower passage port 274, past the check ball 282, thru the upper passage port 219, and into the second partial volume 229 (not shown in this view). This is one direction of air flow. The opposite direction of air flow is also enabled. These flows, of course, provide open communication between the first partial volume 227 and the second partial volume 229 such that their combined volume is available during compression of the suspension unit 200.

FIG. 12 shows the travel adjust lever 252 in the closed position. The cam follower 258, urged upward by internal air pressure, engages cam profile 259B and, as shown, moves away from check ball 282 by a distance "X", which is desirably 0.040" or more. The check ball 282, urged upward by the check ball spring 284 engages check ball seal 283. This seals off any upward air flow from first partial volume 227 to second partial volume 229.

However, this does not seal off flow in the opposite direction, since check ball spring 284 is specified to produce only a small spring force, for example about 0.03 to 0.05 pounds, with the check ball 282 in the sealed position. Accordingly, if the pressure from the second partial volume 229 above the check ball 282 exceeds the pressure below it from first partial volume 227 by approximately 3 to 5 psi, then this pressure differential will overcome the force of check ball spring 284 and check ball 282 will move downward away from sealing contact with check ball seal 283. In this event, air will flow from second partial volume 229 to first partial volume 227.

This characteristic is desirable in order to prevent unintended entrapment of excess air and pressure in the second partial volume 229. For correct function of the adjustable air spring assembly 210, it is preferred that the pressure in second partial volume 229 does not become significantly greater than the pressure in first partial volume 227. Such a situation would result in the pressure within the first partial volume 227 being reduced from its initial, preset level, due to the finite quantity of air within the suspension unit 200. As a result, the spring rate of the air spring 200 in its short travel mode (i.e., only utilizing the first partial volume 227) would be undesirably reduced from its initial setting. Rather, according to the preferred embodiments, the pressure in the second partial volume 229 preferably remains approximately equal to or less than the pressure in first partial volume 227, since the check ball spring 284 creates only a small preload force.

Although the above-described valve assembly is preferred for its simplicity, reliability and low manufacturing cost, other valve arrangements may also be employed. For example, a needle-type valve body may be used in place of the check ball 282. In an alternative arrangement, the cam surface 259 may directly contact the valve body (e.g., the check ball 282) and the cam follower 258 may be omitted. Further, the above-described functions of the valve assembly do not necessarily have to be performed by a single valve arrangement. For example, a first valve arrangement may selectively connect and disconnect the first partial volume 227 and second partial volume 229, while another valve arrangement provides the check valve function of preventing the pressure of the second partial volume 229 from becoming substantially greater than the pressure of the first partial volume 227.

Figures 13, 14:
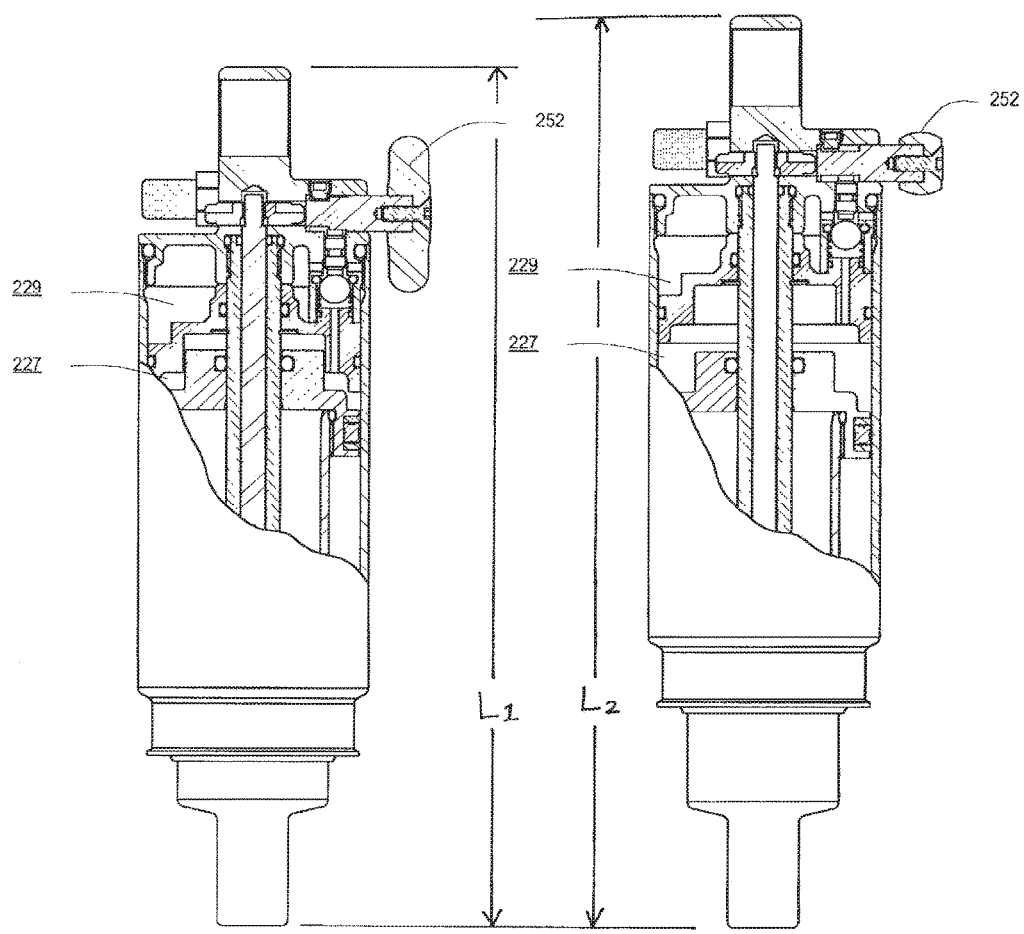
FIG. 13 is a partial sectional view of the suspension unit of FIG. 6, showing the approximate full travel position with the adjusting lever set in the open position.
FIG. 14 is a partial sectional view of the suspension unit of FIG. 6, showing the approximate full travel position with the adjusting lever set in the closed position.

FIG. 13 illustrates a typical full-travel position of suspension unit 200 when travel adjust lever 252 is set in the long-travel mode, such that first partial volume 227 and second partial volume 229 are in full communication.

Similarly, FIG. 14 illustrates a typical full-travel position of suspension unit 200 when travel adjust lever 252 is set in the short-travel mode, such that first partial volume 227 and second partial volume 229 are in not in communication.

Note that the overall compressed lengths of suspension unit 200 are different, with the length $L_1$ in FIG. 13 being shorter than the length $L_2$ in FIG. 14. This will be explained with reference to FIG. 15.

Figure 15:
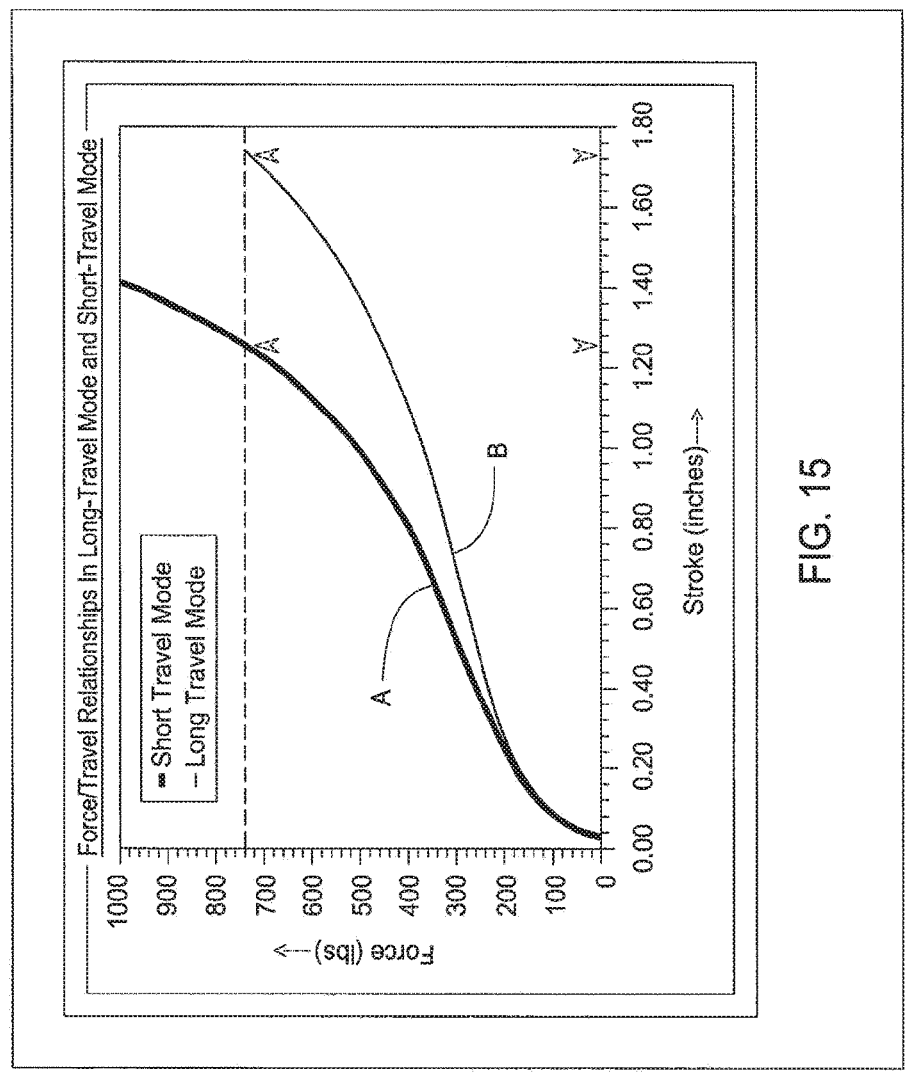
FIG. 15 illustrates the effect of the lever adjustment by comparing the spring curves of the suspension unit of FIG. 6 with the lever in the closed position, and with it in the open position.

FIG. 15 illustrates an example of the force-versus-travel relationships provided by suspension unit 200 in the two different selectable modes: the short-travel mode and the long-travel mode. In the long-travel mode, as shown by curve "B", the force rises more gradually and reaches, in this example, a value of 750 pounds at a stroke distance of about 1.75 inches. In the short-travel mode, as shown by curve "A", the force rises more rapidly and reaches a value of 750 pounds at a stroke distance of only about 1.27 inches, almost ½ inch less than the value for curve "B". This relationship, of course, is the basis for describing the two modes as "long-travel mode" and "short-travel mode".

It should be explained that, although for simplicity in the above example a final external compression force of 750 pounds on the suspension unit 200 is assumed for both cases, this is only an approximation. A rigorous computer motion analysis of a specific situation, centering on the basic equation of motion F=ma (force equals mass times acceleration), would show some difference, but this analysis is generally quite complicated and the difference would generally be relatively small. Thus, the above is a reasonably close approximation assuming that in both cases the vehicle upon which the suspension unit 200 is mounted is subjected to the same bump (or other terrain feature) and other conditions.

Additionally, it should be noted that at 1.27 inches of travel curve "A" is rising steeply. Thus, even if the final force that occurs in the short-travel mode is somewhat greater than the 750 pounds used in the above example, final travel would still be significantly less than curve "B". For example, even if the final force reached 1000 pounds, final travel would still only be slightly more than 1.40 inches. As a preferred embodiment of the present invention is as a shock absorber for a mountain bike, it is desirable that the final force is less than 3000 pounds, desirably, less than 2000 pounds and, more desirably, less than 1000 pounds. Such an arrangement allows the air spring to withstand the impact forces resulting from traversing rough terrain with suspension arrangements presently incorporated on mountain bikes (e.g., wheel travel/shock travel ratio). As will be appreciated by one of skill in the art, for other applications or suspension arrangements, the preferred final force may vary from the values recited above.

In the context of mountain bike suspension assemblies, preferably, the first partial volume 227 is between about 1 and 8 cubic inches. Desirably, the first partial volume 227 is between about 1.5 and 6 cubic inches and, more desirably, between about 2 and 4 cubic inches. Preferably, the second partial volume 229 is between about 0.3 and 4 cubic inches. Desirably, the second partial volume 229 is between about 0.4 and 3 cubic inches and, more desirably, between about 0.5 and 2 cubic inches. Such an arrangement provides a desirable spring rate of the suspension unit 200 when utilizing only the first partial volume 227, as well as when both the first partial volume 227 and second partial volume 299 are used to provide a spring force, for a substantial number of mountain bike applications.

In at least a significant portion of mountain bike suspension applications, it is preferable that the suspension unit 200 provides between about 0.5 and 3 inches of suspension travel in the short travel mode (i.e., utilizing only the first partial volume 227). Desirably, the suspension unit 200 provides between about 0.6 and 2.5 inches of travel and, more desirably, between about 0.75 and 2 inches of suspension travel in the short travel mode. Further, preferably the suspension unit provides between about 0.6 and 5 inches of suspension travel in the long travel mode (i.e., utilizing both the first partial volume 227 and the second partial volume 229). Desirably, the suspension unit 200 provides between about 0.8 and 4 inches of travel and, more desirably, between about 1 and 3 inches of suspension travel in the long travel mode. The range of values set forth above pertains to the relative movement between the two portions of the suspension unit 200 and the actual travel of the suspended bicycle wheel may vary from the travel of the suspension unit 200.

As described earlier, the differences between curve "A" and curve "B" result from the differences in initial chamber volume available during compression of the suspension unit 200. With the travel adjust lever 252 set as in FIG. 13, the total volume of both the first partial volume 227 and the second partial volume 229 are available. With the travel adjust lever 252 set as in FIG. 14, only the volume of first partial volume 227 is available.

These following example calculations will serve to clarify these concepts.

These calculations are based on the well-known Ideal Gas Law for isothermal processes, which is a good first approximation for illustrating the basic principles of the preferred embodiments. This law states that for an enclosed variable volume the internal pressure will vary with volume according to the equation:

$$(P1)*(V1)=(P2)*(V2)$$

where:
P1=initial gas (air) pressure
P2=second gas (air) pressure
V1=initial volume
V2=second volume Here is a simple example of this relationship. Assuming the initial conditions of a sealed, variable chamber are 10 cubic inches of air at 100 psi, if the volume is then reduced to 5 cubic inches the pressure will increase to 200 psi. Considered from another point of view, initial volume divided by final volume equals "compression ratio". In this example the compression ratio is 10 divided by 5, or a compression ratio of 2. Final pressure can be calculated by multiplying initial pressure times compression ratio: 100 psi times 2=200 psi.

In the example of FIGS. 13, 14, and 15, the initial first partial volume 227 of suspension unit 200 is 3.08 cubic inches, and the second partial volume 229 is 1.15 cubic inches. Thus, their combined volume is 4.23 cubic inches, and the volume of first partial volume 227 alone is just 3.08 cubic inches. For the configuration of this example, volume displaced by the seal head 194 per inch of stroke is 1.65 cubic inches per inch. The following sample calculations are made using these values:

For the configuration of FIG. 13, a compression ratio of 3.16 is reached at 1.75 inches of travel:

initial total chamber volume=4.23 cubic inches reduced volume at 1.75 inches travel=1.75.times.1.65=2.89 cubic inches chamber volume at 1.75 inches travel=4.23−2.89=1.34 cubic inches Thus:

compression ratio at 1.75 inches travel=(4.23)/(1.34)=3.16

For the configuration of FIG. 14, an almost identical compression ratio of 3.14 is reached at 1.27 inches of travel:

initial total chamber volume=3.08 cubic inches reduced volume at 1.27 inches travel=1.27.times.1.65=2.10 cubic inches chamber volume at 1.27 inches travel=3.08−2.10=0.98 cubic inches Thus:

compression ratio at 1.27 inches travel=(3.08)/(0.98)=3.14

For the configuration used in this example for suspension unit 200, and assuming an initial pressure of 150 psi, these compression ratios translate to an air spring force in both cases of about 750 pounds. However, the actual air spring force may vary depending on the specific application. Preferably, as described above, in the context of mountain bike suspension assemblies, the spring force is less than approximately 3000 pounds at a substantially fully compressed position of the air spring.

This example, of course, is by way of illustration only, and a wide spectrum of desired relationships between compression ratio and travel, and of the ratio of travel achieved in the short travel mode with that achieved in the long travel mode, can be attained with the illustrated embodiments by designing a particular variable air spring with appropriate dimensional relationships. Preferably, the percentage of travel achieved in the short travel mode with that achieved in the long travel mode is between about 40 and 90 percent. Desirably, the percentage of travel achieved in the short travel mode with that achieved in the long travel mode is between about 50 and 85 percent and, more desirably, between about 60 and 80 percent. Such a change in travel provides desirable suspension performance in both the short travel and long travel modes for at least a significant portion of typical suspension arrangements presently incorporated on mountain bikes.

FIG. 16 shows an alternate preferred embodiment. As discussed previously, this embodiment is somewhat simplified and less costly than the embodiment of FIG. 6. The embodiment of FIG. 16 is possible for suspension units which are generally similar to that of FIG. 6, but provided that no thru-shaft damping adjustment feature, such as shown in FIG. 6, is required. As shown in FIG. 16, when a thru-shaft damping adjustment feature is not required, then the upper end of the shaft 393 becomes available for incorporation of the travel adjust feature. Thus, the travel adjust valve in the embodiment illustrated in FIG. 16 generally extends along a central axis A of the shock shaft 393, which allows a simpler and more cost-effective structure.

In this embodiment, the travel adjust assembly 350 uses the same travel adjust lever 252 as utilized previously. The actuating cam shaft 354 is similar to the previous actuating cam shaft 254, but is somewhat longer. The upper eyelet housing 316 is similar to the previous upper eyelet housing 216, but is somewhat simpler and less costly to produce due to elimination of the previously-required off-center upper passage port coupler 217 which was depicted in FIG. 9. The air cylinder partition 372 is similar to the previous air cylinder partition 272, but it also is somewhat simpler and less costly to produce due in this case to elimination of the previously-required off-center lower passage port boss 273 which was depicted in FIG. 10. The lower passage port 374 and the upper passage port 319, as shown, both consist of a cross-holes drilled in the shaft 393. The upper passage port 319 further consists of drilled or milled passageways in the lower portion of the upper eyelet housing 316 which communicate with the drilled passageways in the shaft 393.

The other elements of the travel adjust assembly 350 as shown in FIG. 16 are neither numbered nor described here since they are essentially identical to the elements numbered and described in the embodiment of FIG. 6.

The present invention is not limited to the above embodiments and various changes may be made within the technical scope of the invention as understood by a person skilled in the art without departing from the spirit and scope thereof.

What is claimed is:

1. A suspension unit operable between a compressed position and an extended position, said suspension unit comprising:
 a first gas chamber:
 a second gas chamber, said second gas chamber biasing said suspension unit toward said extended position; and
 a valve assembly comprising:
  a valve member having:
   an open position where said valve assembly provides open fluid communication between said first gas chamber and said second gas chamber such that a volume of said first gas chamber and a volume of said second gas chamber are effectively combined during compression of said suspension unit; and
   a closed position where said valve assembly prevents gas flow from said second chamber to said first chamber;
  a user-operable travel adjust lever coupled to said valve assembly, said user-operable travel adjust lever configured to enable a user to place said valve member in said open position or said closed position;
  a compression chamber at least substantially filled with damping fluid;
  a rebound chamber at least substantially filled with said damping fluid; and
  a damping piston operable to dampen flow of said damping fluid between said compression chamber and said rebound chamber in response to movement of said suspension unit.

2. A suspension unit operable between a compressed position and an extended position, said suspension unit comprising:
 a first gas chamber:
 a second gas chamber, said second gas chamber biasing said suspension unit toward said extended position; and
 a valve assembly comprising:
  a valve member having:
   an open position where said valve assembly provides open fluid communication between said first gas chamber and said second gas chamber such that a volume of said first gas chamber and a volume of said second gas chamber are effectively combined during compression of said suspension unit; and
   a closed position where said valve assembly prevents gas flow from said second chamber to said first chamber;
  a travel adjust lever coupled to said valve assembly, said travel adjust lever configured to enable a user to place said valve member in said open position or said closed position;
  a compression chamber at least substantially filled with damping fluid;
  a rebound chamber at least substantially filled with said damping fluid; and
  a damping piston operable to dampen flow of said damping fluid between said compression chamber and said rebound chamber in response to movement of said suspension unit.

3. The suspension unit of claim 2 wherein said travel adjust lever rotates 90 degrees between a first travel adjust lever position in which said valve member in said open position and a second travel adjust lever position in which said valve member in said closed position.

* * * * *

UNITED STATES PATENT AND TRADEMARK OFFICE
CERTIFICATE OF CORRECTION

PATENT NO. : 10,202,166 B2  
APPLICATION NO. : 15/395594  
DATED : February 12, 2019  
INVENTOR(S) : Robert C. Fox Page 1 of 1

It is certified that error appears in the above-identified patent and that said Letters Patent is hereby corrected as shown below:

On the Title Page

Column 2, (57) ABSTRACT, Line 10:  
Delete: "bined volumes of the two. gas chambers. The integrated"  
Insert: --bined volumes of the two gas chambers. The integrated--

Page 4, Column 2, Lines 19-22:  
Delete: ""Bycicle Guide--"Suspensions" Great for Paris-Roubaix, But Does it Do for Me?"", Bycicle Guide -- "Suspensions's Great for Paris-Roubaix, But Does it Do for Me?", Jul. 1994, (pp. 29-32, and 39), pp. 29-32, and 39."  
Insert: --"Suspension's Great for Paris-Roubaix, But What Does It Do For Me?", Bicycle Guide, July 1994, (pp. 29-32 and 39).--

Signed and Sealed this  
Ninth Day of April, 2019

Andrei Iancu  
*Director of the United States Patent and Trademark Office*